United States Patent
Willke, II et al.

(10) Patent No.: US 6,708,240 B1
(45) Date of Patent: Mar. 16, 2004

(54) MANAGING RESOURCES IN A BUS BRIDGE

(75) Inventors: Theodore L. Willke, II, Tacoma, WA (US); Warren R. Morrow, Steilacoom, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/538,953

(22) Filed: Mar. 31, 2000

(51) Int. Cl.[7] .............................................. G06F 13/38
(52) U.S. Cl. ...................... 710/240; 710/100; 710/103; 710/112; 710/200; 710/241; 370/229; 370/412; 370/458; 370/462
(58) Field of Search ................................ 710/240, 200, 710/100, 108, 112, 241, 22, 305, 309, 310, 311; 370/462, 458, 412, 229

(56) References Cited

U.S. PATENT DOCUMENTS

| | | | | |
|---|---|---|---|---|
| 5,239,651 A | * | 8/1993 | Sodos ........................ | 710/241 |
| 5,396,602 A | * | 3/1995 | Amini et al. ............... | 370/462 |
| 5,438,666 A | * | 8/1995 | Craft et al. .................. | 710/22 |
| 5,481,680 A | * | 1/1996 | Larson et al. ............... | 710/112 |
| 5,499,346 A | * | 3/1996 | Amini et al. ............... | 710/311 |
| 5,533,204 A | * | 7/1996 | Tipley ........................ | 710/108 |
| 5,689,660 A | | 11/1997 | Johnson et al. | |
| 5,758,166 A | * | 5/1998 | Ajanovic ..................... | 710/240 |
| 5,771,359 A | * | 6/1998 | Galloway et al. ........... | 710/310 |
| 5,815,677 A | * | 9/1998 | Goodrum ..................... | 710/310 |
| 5,845,096 A | | 12/1998 | Munguia et al. | |
| 5,941,964 A | * | 8/1999 | Young et al. ................ | 710/100 |
| 5,991,833 A | | 11/1999 | Wandler et al. | |
| 6,006,303 A | * | 12/1999 | Barnaby et al. ............. | 710/240 |
| 6,072,772 A | * | 6/2000 | Charny et al. .............. | 370/229 |
| 6,141,715 A | * | 10/2000 | Porterfield .................. | 710/108 |
| 6,192,471 B1 | * | 2/2001 | Pearce et al. ............... | 710/200 |
| 6,260,095 B1 | * | 7/2001 | Goodrum ..................... | 710/310 |
| 6,359,900 B1 | * | 3/2002 | Dinakar et al. ............. | 370/458 |
| 6,466,580 B1 | * | 10/2002 | Leung ......................... | 370/412 |

* cited by examiner

Primary Examiner—Xuan M. Thai
Assistant Examiner—Justin King
(74) Attorney, Agent, or Firm—Fish and Richardson P.C.

(57) ABSTRACT

A method and system of managing resources in a host bridge by determining whether resources are deficient, preventing a second device from obtaining further resources and if this measure does not enable a first device to obtain resources, guaranteeing all resources to the first device.

29 Claims, 5 Drawing Sheets

MANAGING RESOURCES IN A BUS BRIDGE

BACKGROUND

The invention relates to managing resources in a bus bridge.

A Peripheral Component Interconnect PCI bus, for example, may connect peripheral devices ("PCI masters") such as CD-ROM drives, graphics accelerators and sound cards to other computer system components. Each master can send transaction requests, such as read and write requests, to main memory through the PCI bus.

Requests made from a PCI master to main memory must pass through a PCI host bridge, which can only accommodate a limited number of transactions due to finite internal buffer resources. When more than one device makes a request, the PCI host bridge acts as an arbiter and grants access to one or more of the PCI masters to increase use up to the limit of its resources.

The host bridge may use round-robin arbitration to grant access to requests in its buffer in first-in, first-out (FIFO) order.

In a conventional round-robin arbitration, aggressive PCI masters may make so many requests in a short time that all the buffer resources of the host bridge may be used before other devices can make a request. Even if a device resubmits its rejected request later, the request may be rejected repeatedly if the PCI resources are not available. Thus, a PCI master might have its requests rejected indefinitely and be effectively locked out, unable to send or receive data.

DESCRIPTION

Figure 1:
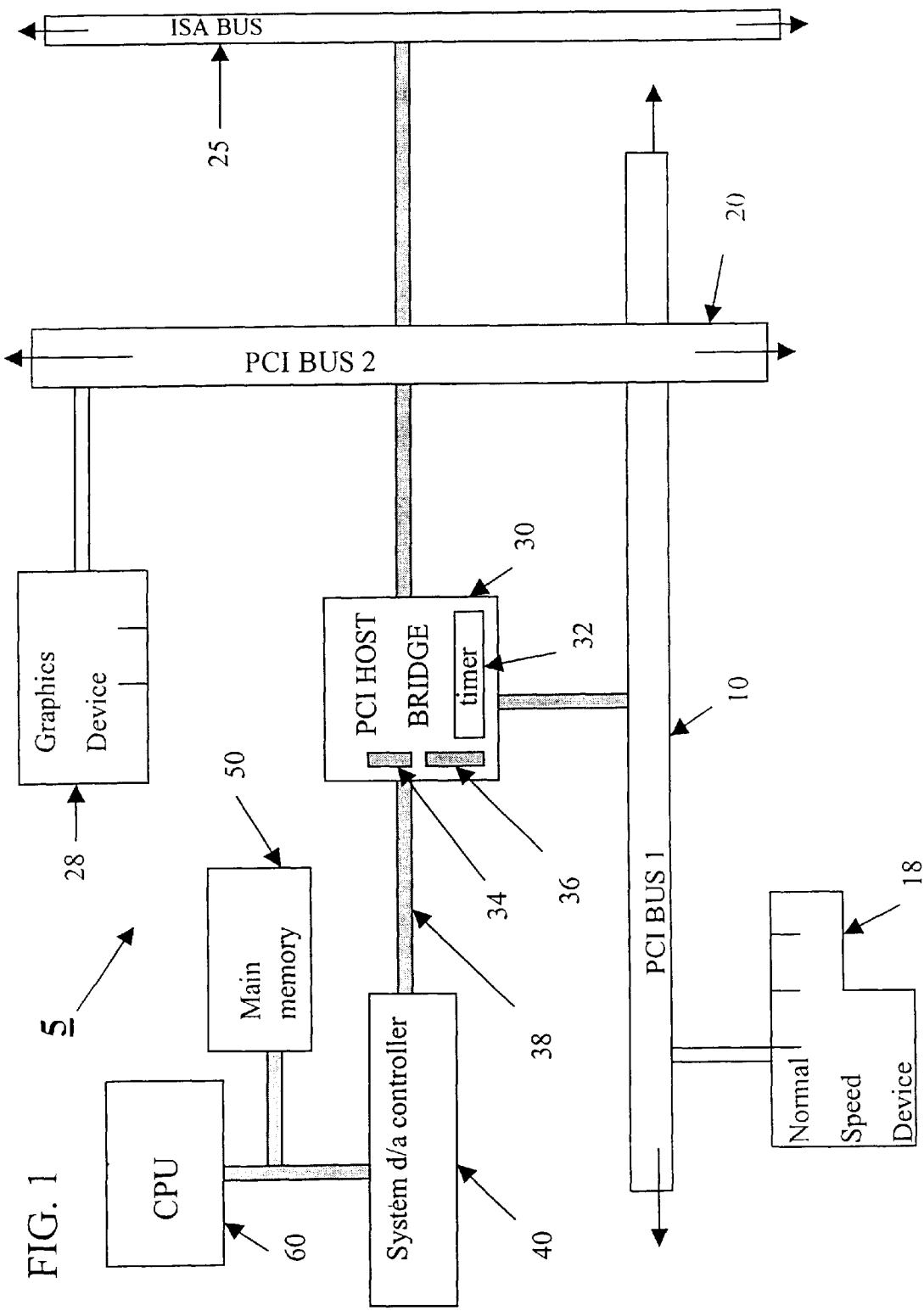
FIG. 1 shows an exemplary computer system.

FIG. 1 illustrates a computer system 5 that contains two PCI buses 10, 20. Although two PCI buses are shown, computer system 5 can contain a greater or lesser number of buses. PCI masters 18, 28 are connected to PCI buses 10 and 20, respectively. PCI master 18 is denoted a normal speed device, and PCI master 28 is denoted a graphics device. In other implementations, each of PCI buses 10, 20 may carry a different type and/or different number of devices than those shown. ISA bus 25 also is connected to PCI bus 20. ISA bus 25 is considered a PCI master with respect to PCI bus 20.

The PCI masters can initiate data transactions independently of each other. Each request is transferred along the PCI bus 10, 20 which can have a high clock rate and high carrying capacity, allowing it to transport many PCI master requests simultaneously. Requests can be directed, for example, to main memory 50, which functions as the working memory for a CPU 60 and generally includes an array of memory devices such as dynamic access memory (DRAM). A local bridge 40, called the system data/address controller (system d/a controller), regulates transactions between the CPU 60 and main memory 50.

When a device connected to an individual PCI bus 10, 20 initiates a data transaction with another device connected to the same PCI bus or with main memory 50, the transaction request passes through a PCI host bridge 30. Those transactions are known as inbound transactions. The following discussion assumes that transactions are inbound, but the techniques described below apply to outbound transactions as well, such as transactions between CPU 60 and PCI masters 18, 28 or between masters on different PCI buses.

The PCI host bridge 30 can be implemented as part of a chipset. The chipset may be, for example, an Intel 460GX™ or any other compatible chipset. The PCI host bridge 30 acts as a gatekeeper, limiting the number of transactions that occur between the PCI devices 18, 28 and main memory 50.

PCI master requests enter a transaction queue 34 of the PCI host bridge 30. Each request includes a header that contains information about the source and target of the request, and a payload that contains the data being transported. The header and payload are divided within the PCI host bridge 30. The header information enters the transaction queue 34 and, if memory is available, the payload information enters a transaction data buffer 36.

Figure 2:
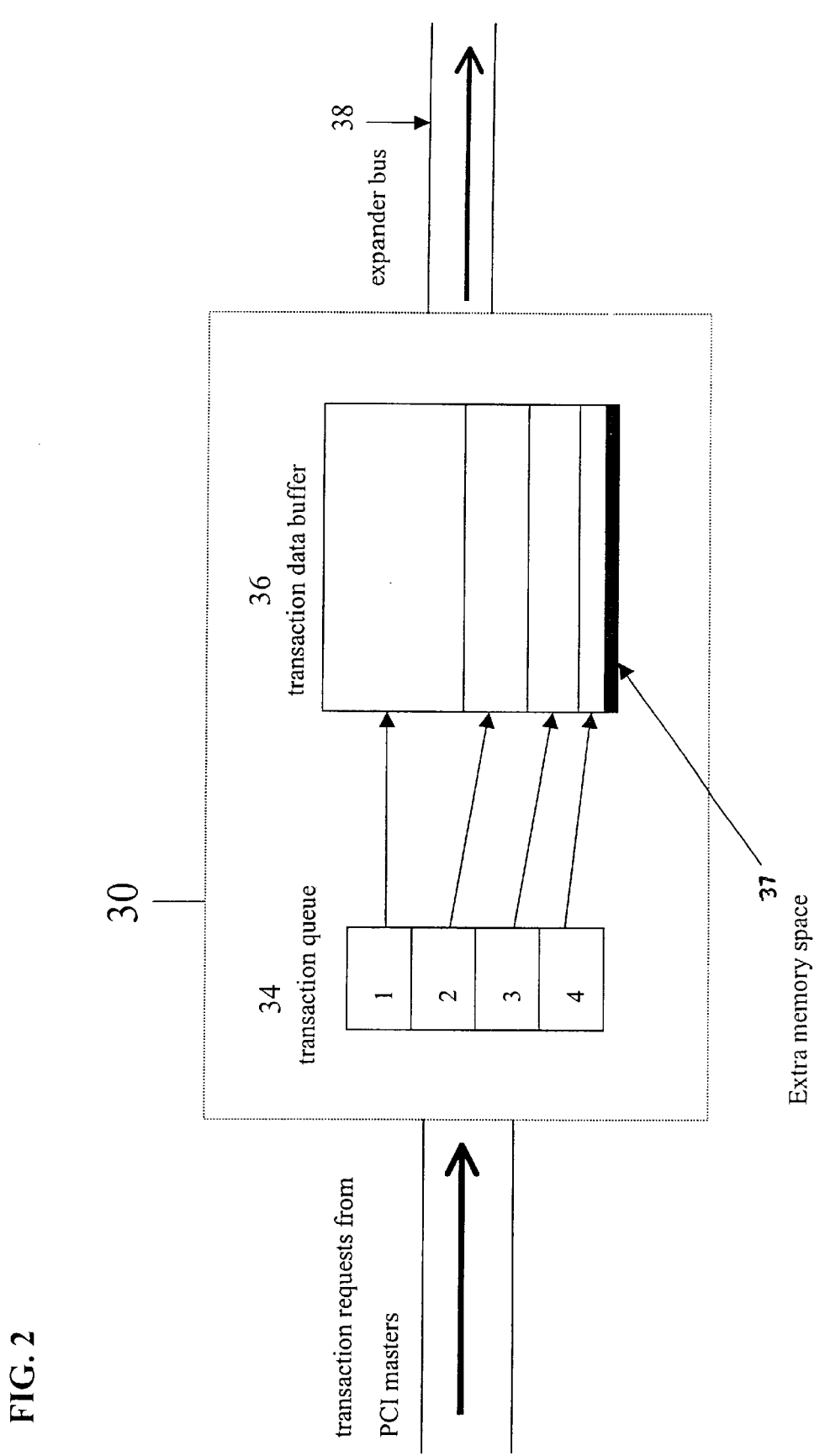
FIGS. 2 and 3 illustrate the use of buffer resources.

As shown in FIG. 2, an exemplary transaction queue 34 contains the header information for four transactions labeled 1 through 4. An arrow points from each transaction in the queue 34 to a corresponding block of memory space within the transaction data buffer 36, indicating that each transaction header holds information required to associate it with its corresponding payload data.

The transactions can carry different amounts of data that occupy different amounts of memory. The transaction data buffer 36 contains extra memory space 37 because the four transactions do not occupy the full capacity of the buffer.

Data in the transaction data buffer 36 that is targeted to main memory is transported from the buffer through an expander bus 38. In this manner, the transaction data buffer 36 is drained of data and can expend its resources on other transactions.

Figure 3:
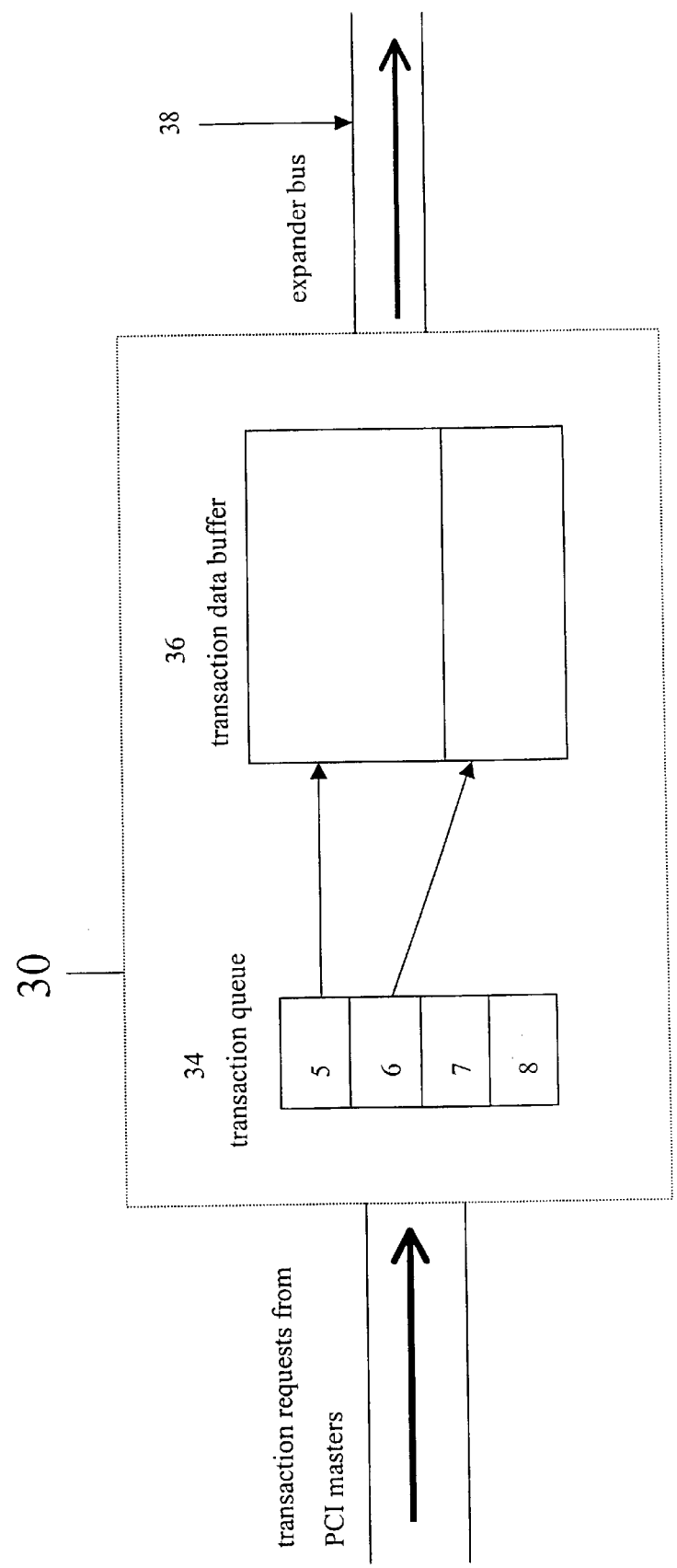

FIG. 3 illustrates a different set of transactions 5–8. In this case, all resources of the transaction data buffer 36 are used by requests 5 and 6, leaving transactions 7 and 8 without any buffer space in which to store their payloads, and those requests are rejected by the PCI host bridge 30. To prevent a PCI master from becoming starved for resources indefinitely, the host bridge 30 stores and executes a resource starvation prevention algorithm, which can be enabled or disenabled by an administrator. The algorithm can be implemented, for example, as a state machine and associated registers and logic gates.

Figure 4:
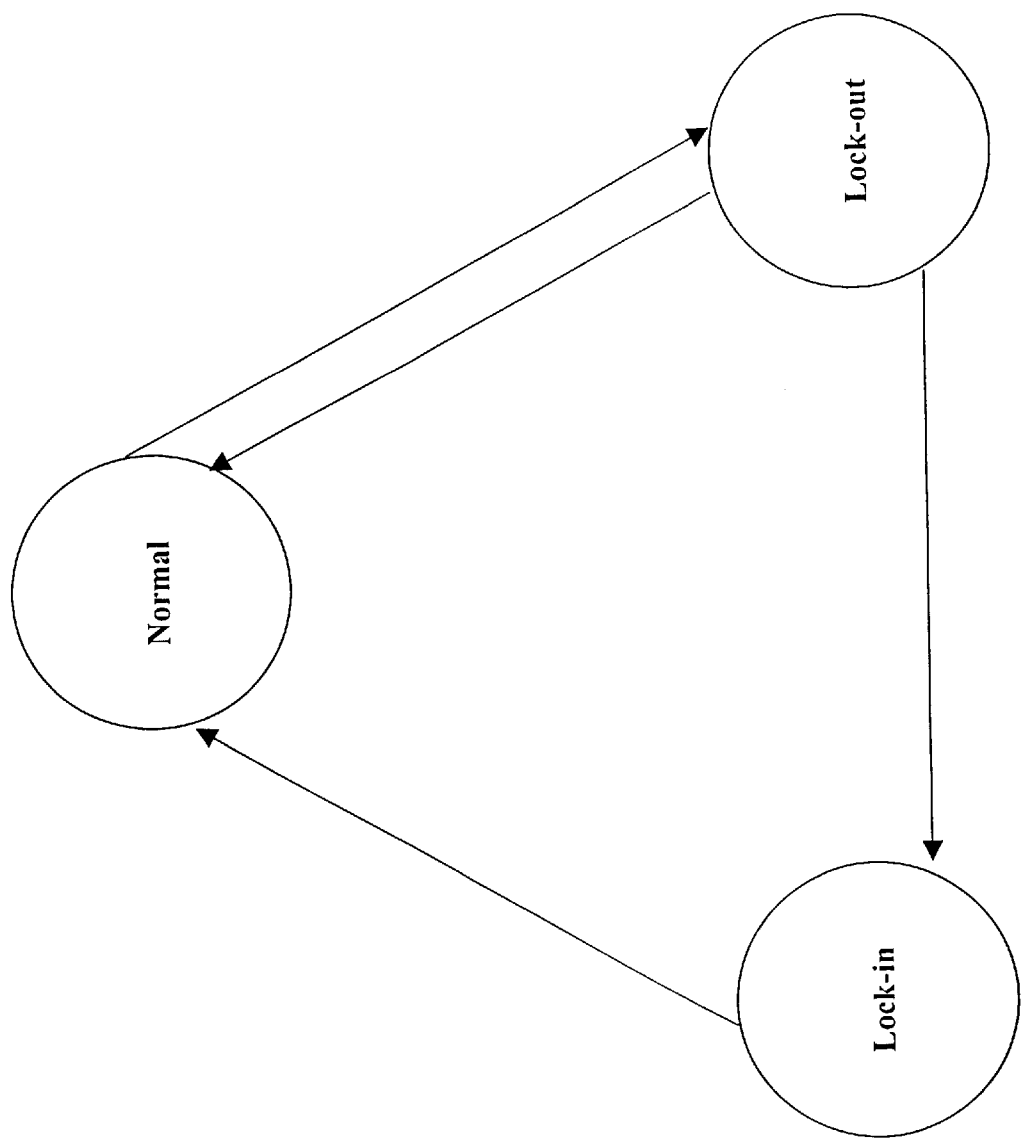
FIG. 4 illustrates a relationship among states of resource allocation.

As shown in FIG. 4, the state machine includes three distinct states: a first "normal" state, a second "lock-out" state, and a third "lock-in" state. In the normal state, all PCI masters 18, 25 and 28 are given equal access, meaning that if resources are available, no PCI master 18, 25, 28 will be denied access to the buffer resources of the host bridge 30. Then, if a PCI master, such as graphics device 28, is unable to obtain resources, the algorithm proceeds to the lock-out state in which one of the PCI masters that already has been granted access is prevented from obtaining further access for a specified period of time. The algorithm can proceed back to the normal state from the lock-out state if the starved master 28 obtains access. Alternatively, it can proceed to the lock-in state, in which only the starved master is permitted access to the buffer resources of the host bridge 30.

By implementing a three-state system, the algorithm provides both an intermediate resource-limiting state (the lock-out state) that is suited for cases of milder resource starvation, and a more extreme resource-limiting state (the lock-in state) that provides resources to PCI masters that are continually starved. Using different levels of resource-starvation prevention, the PCI host bridge 30 can prevent such starvation at an early stage and promote a more evenly balanced allocation of resources among the PCI masters 18, 25, 28.

During the execution of the resource-starvation prevention algorithm, the PCI host bridge 30 employs a PCI timer 32 (FIG. 1) to reset the system to the normal state if a PCI master fails to return and claim resources on its behalf. The timer, which can be implemented in hardware or software, allows the system to remain in the lock-out or lock-in state for a specified time t1, that is greater than the average amount of time it takes for the expander bus 38 to drain the transaction data buffer 36.

Figure 5:
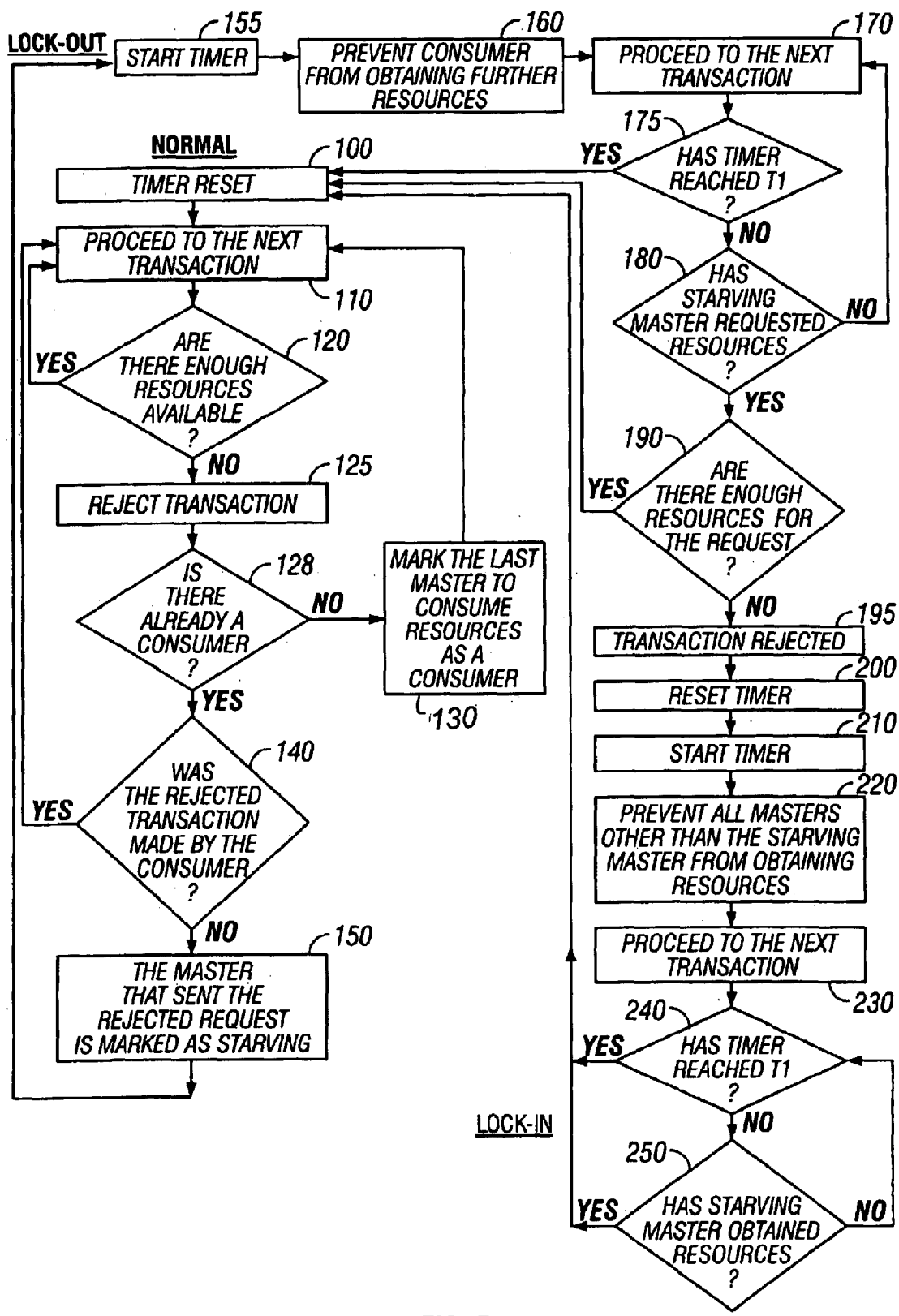
FIG. 5 is a flow chart of a method of managing resources according to the invention.

Further details of the operation of the PCI host bridge 30 are explained with reference to FIG. 5. Initially, the timer 32 is reset 100, any software flags (described below) that identify particular PCI masters 18, 25, 28 are removed. The PCI host bridge 30 proceeds 110 to the next transaction in its transaction queue 34 and determines 120 whether the total remaining buffer resources are sufficient to accommodate the next transaction. If there are enough remaining resources, the host bridge 30 proceeds 110 to another transaction in the buffer 34.

If there are not enough buffer resources to accommodate a transaction, the transaction request is rejected 125. Unless it is determined 128 that a PCI master has already been marked, the PCI master that added the most recently accommodated transaction is marked 130 with a first software flag as a "consumer". After marking a PCI master "consumer" the host bridge proceeds 110 to the next transaction. If it is determined 128 that a "consumer" has already been marked, the host bridge 30 then determines 140 whether a non-marked master was rejected in 125. If the last rejected transaction request was sent from the PCI master marked "consumer", then the prevention system remains in its normal state and cycles back, proceeding 110 to a new transaction. If the rejected transaction request came from a PCI master that is not marked as a consumer, then that PCI master is marked 150 with a second software flag as "starving." The host bridge 30 operates in the lock-out state, the timer 32 starts 155, and the master that previously was marked "consumer" is prevented 160 from receiving any further resources.

After the host bridge proceeds 170 to the next transaction, it is determined 175 whether the timer has reached t1. If the timer has reached t1, the system returns to the normal state, and the timer and software flags are reset 100. If, while in the lock-out state, the timer has not reached t1, the host bridge 30 determines 180 whether the PCI master marked "starving" has requested resources. If the PCI master has not requested resources, the host bridge 30 proceeds 170 to the next transaction. If the "starving" PCI master has requested resources and it is determined 190 that there are enough resources to accommodate its request, the system returns to the normal state and resets 100. If there are not enough resources to accommodate the "starving" PCI master's request, the transaction request is rejected 195, and the system changes to the lock-in state.

Upon entering the lock-in state, the timer 32 is reset 200 and starts 210 again. The host bridge 30 prevents 220 all other PCI masters except for the "starving" master from obtaining resources. The host bridge 30 proceeds 230 to the next transaction and determines 240 whether the timer 32 has reached t1. If the timer has reached t1, the system returns to the normal state and resets 100. If the timer has not reached t1, it is determined 250 whether the "starving" PCI master has obtained the resources it requests. If it has, the system returns to the normal state and resets 100. If it has not, the system cycles back and proceeds 230 to the next transaction.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
    granting access to a first device to use buffer resources in a bus bridge;
    determining whether buffer resources in the bus bridge are available to store a transaction sent from a second device;
    preventing only the first device that is coupled to a bus from obtaining further access to the buffer resources in the bus bridge for a specified time period if the buffer resources are not available to the second device;
    during the specified time period, determining whether buffer resources in the bus bridge are available to store a transaction sent from the second device; and
    guaranteeing access to the second device if the second device is unable to obtain requested buffer resources in the bus bridge during the specified time period by preventing all other devices from obtaining access to the buffer resources.

2. The method of claim 1 wherein the bus bridge comprises a Peripheral Component Interconnect (PCI) host bridge.

3. The method of claim 1 including setting a first software flag for the first device if buffer resources in the bus bridge are unavailable to store a transaction from the second device.

4. The method of claim 3 including setting a second software flag for the second device if, after the first software flag has been set for the first device, the second device requests and is unable to obtain buffer resources.

5. The method of claim 1, wherein guaranteeing access to the second device comprises preventing all other devices from obtaining access to the buffer resources for a second specified time period.

6. The method of claim 1, wherein the specified time period is greater than an average amount of time for an expander bus coupled to the bus bridge to remove data from the buffer resources.

7. A method comprising:
    operating a host bridge in a first state in which first and second devices coupled to a bus are given equal access to available buffer resources of the host bridge;
    operating in a second state that prevents the first device from obtaining access to the buffer resources for a specified time period if buffer resources requested by the second device are unavailable; and
    operating in a third state that only allows the second device to obtain access to the buffer resources if buffer resources requested by the second device are unavailable while in the second state.

8. The method of claim 5 wherein the resources comprise buffer resources of a PCI host bridge.

9. The method of claim 5 including setting a limit for the time period of the second state.

10. The method of claim 9 including setting a limit for the duration of the third state.

11. Apparatus comprising:
a host bridge comprising buffer resources and a timer, the host bridge being coupled to at least one bus, wherein the host bridge manages its buffer resources by (a) preventing a first device coupled to the bus from obtaining further access to the buffer resources for a time period specified by the timer if the host bridge determines that the buffer resources are not available to a second device, and by (b) guaranteeing access to the second device if the second device is unable to obtain requested resources during the specified time period by preventing other devices from obtaining access to the bus buffer resources.

12. The apparatus of claim 11 wherein the host bridge sets a first software flag for a first device if buffer resources are unavailable to accommodate a transaction from the second device.

13. The apparatus of claim 12 wherein the host bridge sets a second software flag for the second device if, after the first software flag has been set for the first device, the second device requests and is unable to obtain resources.

14. Apparatus comprising:
a host bridge coupled to at least one bus wherein the host bridge operates in a first state in which first and second devices coupled to the bus are given equal access to available buffer resources of the host bridge; operates in a second state that prevents the first device from obtaining access to the buffer resources for a specified time period if resources requested by the second device are unavailable; and operates in a third state that only allows the second device to obtain access to the buffer resources if buffer resources requested by the second device are unavailable while in the second state.

15. The apparatus of claim 14 wherein the resources comprise buffer resources of a PCI host bridge.

16. The apparatus of claim 14 wherein the host bridge sets a limit for the time period of the second state.

17. The apparatus of claim 14 wherein the host bridge sets a limit for the duration of the third state.

18. An article comprising a computer-readable medium which stores computer-executable instructions for causing a computer system to:
grant access to a first device to use buffer resources in a bus bridge;
determine whether buffer resources in the bus bridge are available to a second device; prevent only the first device that is coupled to a bus from obtaining further access to the buffer resources in the bus bridge for a specified time period if the buffer resources are not available to the second device; and
guarantee access to the second device if the second device is unable to obtain further requested buffer resources in the bus bridge during the specified time period by preventing all other devices from obtaining access to the buffer resources.

19. The article of claim 18 wherein the resources comprise buffer resources of a PCI host bridge.

20. The article of claim 18 which further stores instructions causing a computer to set a first software flag for the first device if buffer resources in the bus bridge are unavailable to accommodate a transaction from the second device.

21. The article of claim 20 which further stores instructions causing a computer to set a second software,flag for the second device if, after the first software flag has been set for the first device, the second device requests and is unable to obtain buffer resources.

22. An article comprising a computer-readable medium which stores computer-executable instructions for causing a host bridge to:
operate in a first state in which first and second devices coupled to a bus are given equal access to available buffer resources of the host bridge; operate in a second state that prevents the first device from obtaining access to the buffer resources for a specified time period if buffer resources requested by the second device are unavailable; and operate in a third state that only allows the second device to obtain access to buffer resources if the buffer resources requested by the second device are unavailable while in the second state.

23. The article of claim 22 wherein the resources comprise the buffer resources of a PCI host bridge.

24. The article of claim 22 wherein the host bridge sets a limit for the time period of the second state.

25. The article of claim 22 wherein the host bridge sets a limit for the duration of the third state.

26. A computer system comprising:
a central processing unit;
a host bridge having buffer resources and a timer;
a memory device coupled to the central processing unit;
at least one bus coupled to the host bridge;
at least a first device and a second device coupled to the a bus; and
wherein the computer system:
determines whether buffer resources are available to the second device;
prevents the first device that is coupled to the bus from obtaining further access to buffer resources for a specified time period if it is determined that the buffer resources are not available to the second device; and
guarantees access to the second device if the second device is unable to obtain requested resources during the specified time period by preventing other devices from obtaining access to the buffer resources.

27. The computer system of claim 26 wherein the resources comprise buffer resources of a PCI host bridge.

28. The computer system of claim 26 further configured to set a first software flag for the first device if resources are not available to accommodate a transaction from the second device.

29. The computer system of claim 28 further configured to set a second software flag for the second device if, after the first software flag has been set for the first device, the second device requests and is unable to obtain buffer resources.

* * * * *